United States Patent
Yasui

(10) Patent No.: US 12,141,982 B2
(45) Date of Patent: Nov. 12, 2024

(54) IMAGE PROCESSING APPARATUS, IMAGE PROCESSING METHOD, AND COMPUTER-READABLE STORAGE MEDIUM STORING PROGRAM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 17/685,007

(22) Filed: Mar. 2, 2022

(65) Prior Publication Data
US 2022/0292686 A1 Sep. 15, 2022

(30) Foreign Application Priority Data
Mar. 12, 2021 (JP) ................ 2021-040660

(51) Int. Cl.
*G06T 7/11* (2017.01)
*B60K 35/00* (2006.01)
(Continued)

(52) U.S. Cl.
CPC ............... *G06T 7/11* (2017.01); *B60K 35/00* (2013.01); *G06F 3/14* (2013.01); *G06T 5/50* (2013.01);
(Continued)

(58) Field of Classification Search
CPC ............ B60K 35/00; B60K 2360/1523; B60K 2360/25; B60K 2360/16; B60K 35/22;
(Continued)

(56) References Cited

U.S. PATENT DOCUMENTS

2013/0222591 A1* 8/2013 Alves .................. B61L 3/127
348/148
2017/0327069 A1* 11/2017 Kim .................... G06V 20/593
(Continued)

FOREIGN PATENT DOCUMENTS

CN        112116620 A      12/2020
JP        2003-296709 A    10/2003
(Continued)

OTHER PUBLICATIONS

Japanese Office Action for Japanese Patent Application No. 2021-040660 mailed Sep. 6, 2024 (partially translated).
(Continued)

*Primary Examiner* — Congvan Tran
(74) *Attorney, Agent, or Firm* — Thomas | Horstemeyer, LLP

(57) ABSTRACT

An image processing apparatus comprises: a image capturing unit configured to capture an image including a region corresponding to an inside of a vehicle and a region corresponding to an outside of the vehicle; an acquisition unit configured to acquire a plurality of images captured by the image capturing unit at predetermined time intervals; a generation unit configured to generate a mask filter for masking the region corresponding to the inside of the vehicle in the image captured by the image capturing unit based on an amount of change in the plurality of images acquired by the acquisition unit; and a storage unit configured to store the mask filter generated by the generation unit.

15 Claims, 11 Drawing Sheets

(51) Int. Cl.
    *G06F 3/14*     (2006.01)
    *G06T 5/50*     (2006.01)
    *G06T 7/20*     (2017.01)
    *G06V 20/58*     (2022.01)
    *B60K 35/22*     (2024.01)
    *B60K 35/28*     (2024.01)

(52) U.S. Cl.
    CPC ................ *G06T 7/20* (2013.01); *G06V 20/58* (2022.01); *B60K 35/22* (2024.01); *B60K 35/28* (2024.01); *B60K 2360/16* (2024.01); *B60K 2360/21* (2024.01); *B60K 2360/25* (2024.01); *B60K 2360/349* (2024.01); *G06T 2207/20216* (2013.01); *G06T 2207/30252* (2013.01); *G06T 2207/30268* (2013.01)

(58) Field of Classification Search
    CPC ................ B60K 35/28; B60K 2360/21; B60K 2360/349; G06V 40/103; G06V 10/62; G06V 20/58; G06T 7/11; G06T 7/20; G06T 5/50; G06T 2207/30268; G06T 2207/30252; G06T 2207/20216; G06F 3/14; G09G 2380/10; G09G 2360/16
    See application file for complete search history.

(56) References Cited

U.S. PATENT DOCUMENTS

| | | | |
|---|---|---|---|
| 2018/0101178 A1* | 4/2018 | Yoon | G06V 10/462 |
| 2021/0067742 A1* | 3/2021 | Miki | G06V 40/161 |
| 2022/0180615 A1* | 6/2022 | Miyatani | H04N 23/90 |
| 2022/0321873 A1 | 10/2022 | Sugano et al. | |
| 2022/0377275 A1* | 11/2022 | Miyatani | H04N 23/54 |

FOREIGN PATENT DOCUMENTS

| | | |
|---|---|---|
| JP | 2007-315861 A | 12/2007 |
| JP | 2012-160977 A | 8/2012 |
| JP | 2016-111509 A | 6/2016 |
| JP | 2016-224649 A | 12/2016 |
| JP | 2019-139471 A | 8/2019 |
| JP | 2020-042422 A | 3/2020 |
| JP | 2020-047165 A | 3/2020 |
| JP | 2020-188368 A | 11/2020 |

OTHER PUBLICATIONS

Katsumata et al., YurikamoMe: Floating Experience above Railways by two 360-degree Cameras, Information Processing Society, Symposium, Entertainment Computing Symposium, Jan. 9, 2017, pp. 79-84, Japan.

Hasunuma, Application of Image Technology in ITS: Introducing the Overall Picture of Image Technology Application Fields in Vehicles, Infrastructure, Maps, Accident Analysis, etc., Image Lab, Jun. 10, 2008, pp. 86-90, vol. 19, No. 6, Japan Industrial Publishing Co., Ltd., Japan.

* cited by examiner

FIG. 3
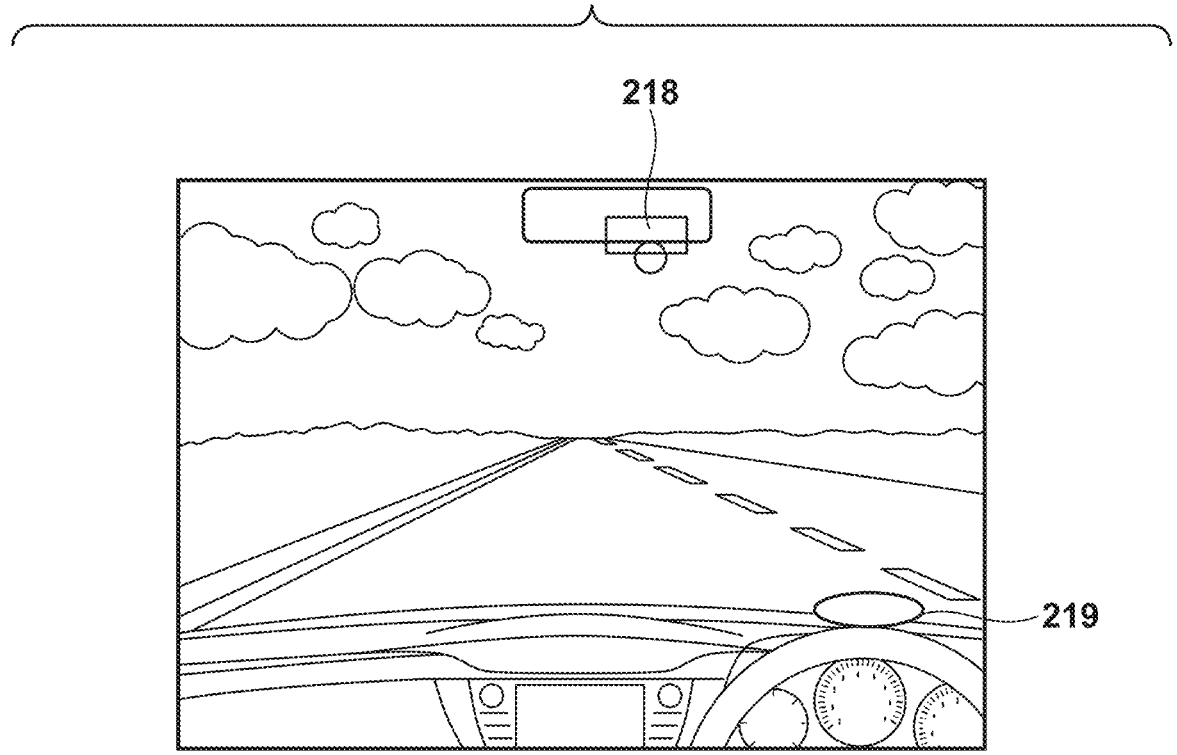
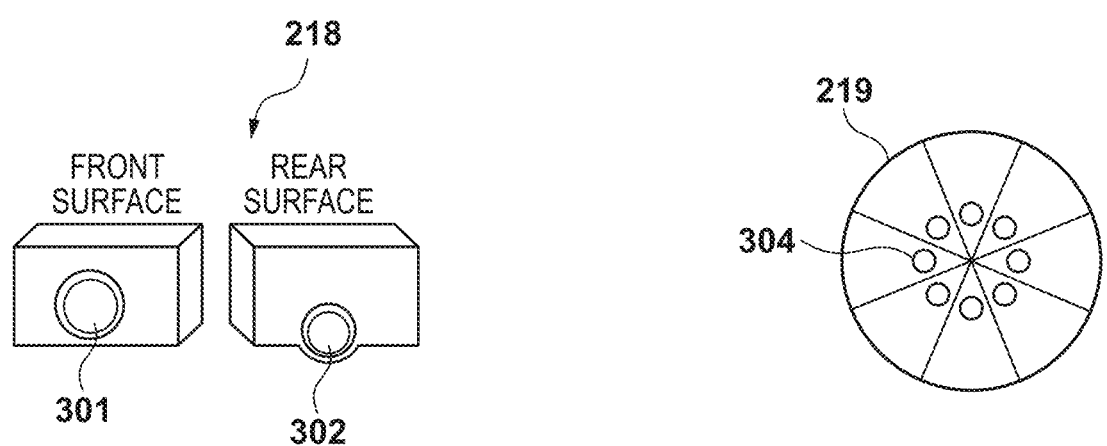

FIG. 4
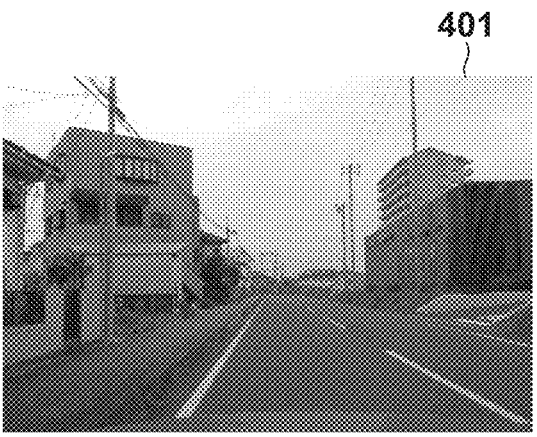
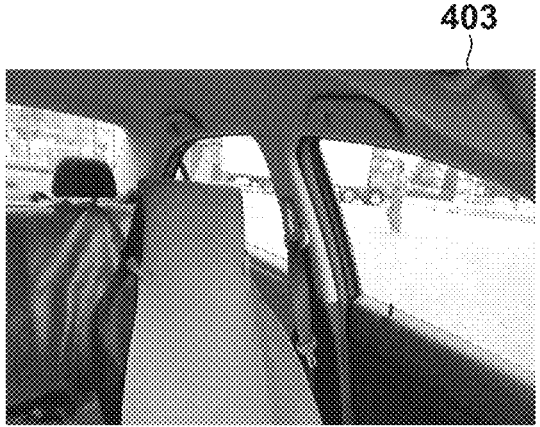

FIG. 9
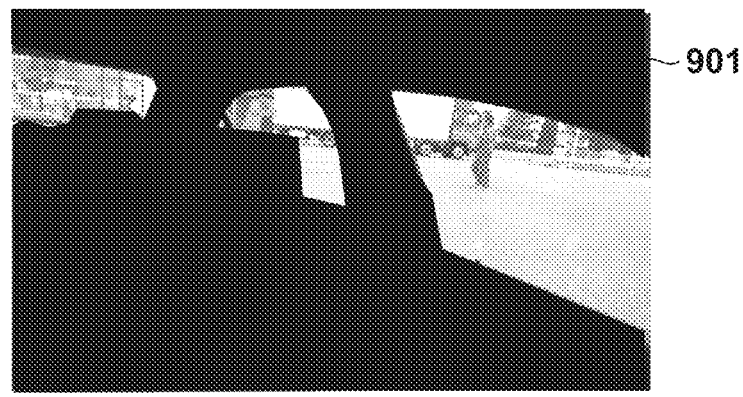
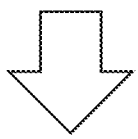
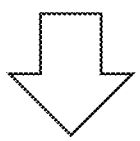
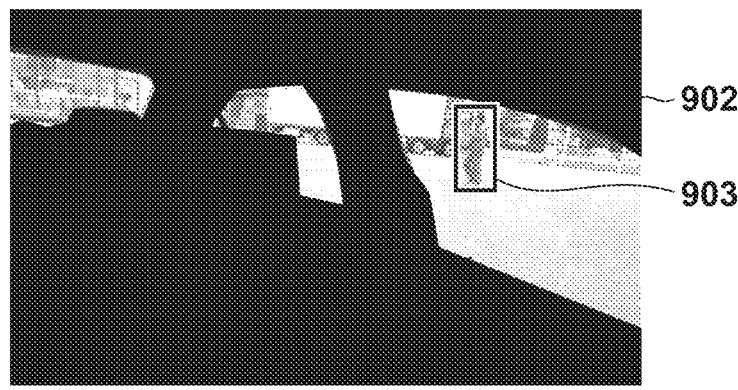

IMAGE PROCESSING APPARATUS, IMAGE PROCESSING METHOD, AND COMPUTER-READABLE STORAGE MEDIUM STORING PROGRAM

CROSS-REFERENCE TO RELATED APPLICATION(S)

This application claims priority to and the benefit of Japanese Patent Application No. 2021-040660 filed on Mar. 12, 2021, the entire disclosure of which is incorporated herein by reference.

BACKGROUND OF THE INVENTION

Field of the Invention

The present invention relates to an image processing apparatus, an image processing method, and a computer-readable storage medium storing a program that process images captured by an image capturing unit.

Description of the Related Art

Various processes are performed on images captured by a camera mounted on a vehicle. Japanese Patent Laid-Open No. 2016-224649 describes that a part of an image captured by a capturing means attached with a field of view rearward from a side mirror is excluded from a processing range based on a fact that the magnitude of variation in luminance or hue of each pixel is equal to or less than a predetermined threshold value. Japanese Patent Laid-Open No. 2016-111509 describes that a mask image is generated so as to correspond with a vehicle body portion in a captured image captured by a capturing unit arranged in the vicinity of a side mirror, and visibility of a driver to other vehicles is more appropriately improved. Japanese Patent Laid-Open No. 2007-315861 describes superimposing and displaying figures for route guidance on an image captured by an in-vehicle camera installed around the windshield and capturing an image of the front of the self-vehicle.

Meanwhile, regarding image processing, techniques are known that a road surface background image is created by removing moving objects from an image and extracting only a road surface background (Japanese Patent Laid-Open No. 2003-296709), and that in object recognition processing, a degree of importance of luminance in a region having a higher degree of importance is set relatively higher, and adjustment is performed such that the region having the higher degree of importance has optimum luminance (Japanese Patent Laid-Open No. 2019-139471).

SUMMARY OF THE INVENTION

However, none of the Patent Literatures mentions that moving objects outside the vehicle can be appropriately recognized based on captured images including the inside and the outside of the vehicle captured from the inside of the vehicle.

The present invention provides an image processing apparatus, an image processing method, and a computer-readable storage medium storing a program that enable appropriate recognition of moving objects outside a vehicle based on images captured from the inside of the vehicle.

The present invention in its first aspect provides an image processing apparatus comprising: a image capturing unit configured to capture an image including a region corresponding to an inside of a vehicle and a region corresponding to an outside of the vehicle; an acquisition unit configured to acquire a plurality of images captured by the image capturing unit at predetermined time intervals; a generation unit configured to generate a mask filter for masking the region corresponding to the inside of the vehicle in the image captured by the image capturing unit based on an amount of change in the plurality of images acquired by the acquisition unit; and a storage unit configured to store the mask filter generated by the generation unit.

The present invention in its second aspect provides an image processing method, comprising: acquiring a plurality of images captured by an image capturing unit configured to capture an image including a region corresponding to an inside of a vehicle and a region corresponding to an outside of the vehicle at predetermined time intervals; generating a mask filter for masking the region corresponding to the inside of the vehicle in the image captured by the image capturing unit based on an amount of change in the plurality of images acquired; and storing, in a storage unit, the mask filter generated.

The present invention in its third aspect provides a non-transitory computer-readable storage medium storing a program for causing a computer to function to: acquire a plurality of images captured by an image capturing unit configured to capture an image including a region corresponding to an inside of a vehicle and a region corresponding to an outside of the vehicle at predetermined time intervals; generate a mask filter for masking the region corresponding to the inside of the vehicle in the image captured by the image capturing unit based on an amount of change in the plurality of images acquired; and store, in a storage unit, the mask filter generated. The generation unit generates the mask filter by performing binarization processing on the averaged image.

According to the present invention, it is possible to appropriately recognize moving objects outside a vehicle based on images captured from the inside of the vehicle.

BRIEF DESCRIPTION OF THE DRAWINGS

FIG. 3 is a diagram for explaining a drive recorder and an indicator;

FIG. 4 is a diagram illustrating captured images by the drive recorder;

FIG. 9 is a diagram for explaining object detection using a masked image;

DESCRIPTION OF THE EMBODIMENTS

Figure 1:
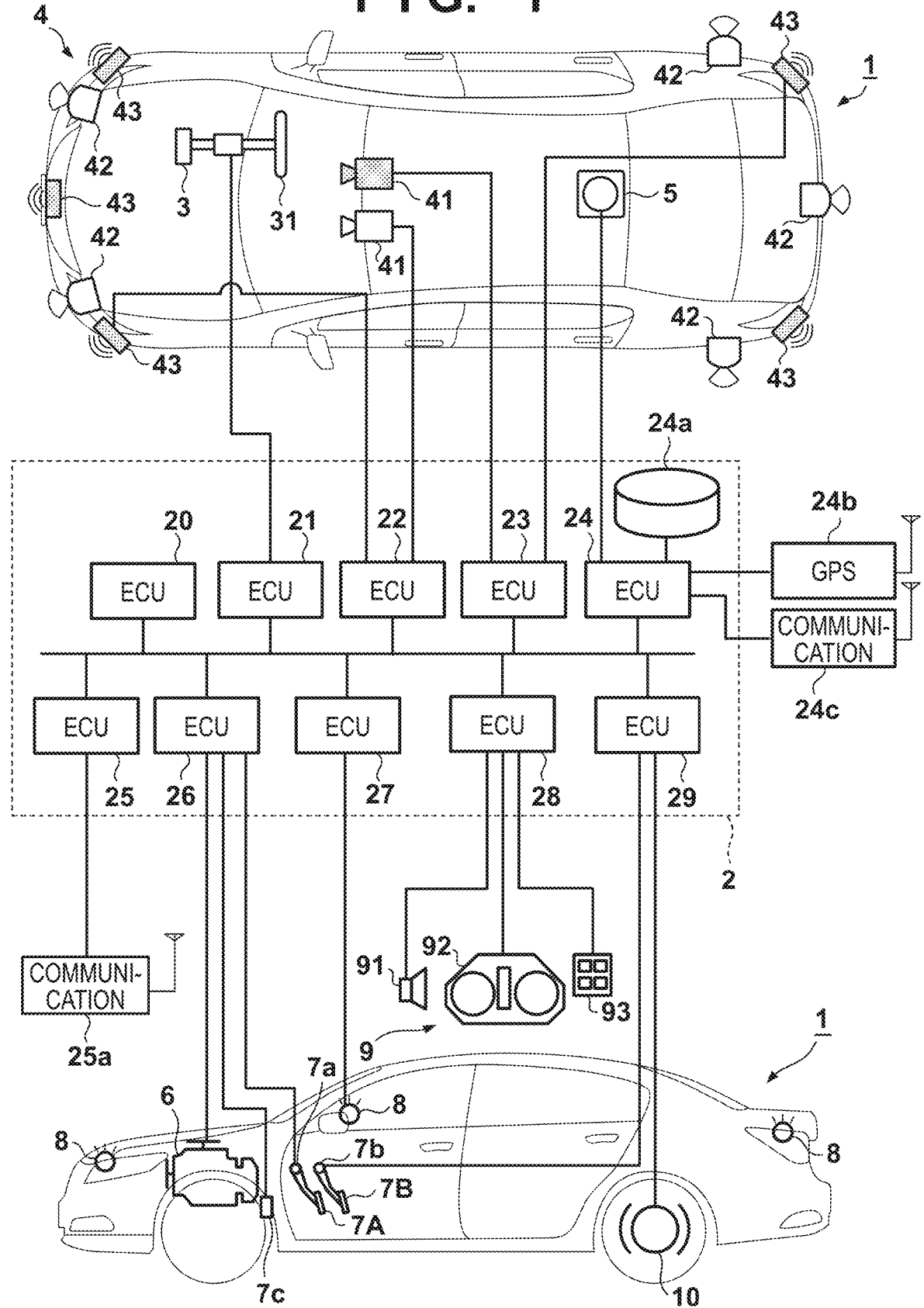
FIG. 1 is a diagram illustrating a configuration of a vehicle control device.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle control device (travel control device) according to an embodiment of the present invention, and the vehicle control device controls a vehicle 1. In FIG. 1, the vehicle 1 is schematically illustrated in a plan view and a side view. The vehicle 1 is, for example, a sedan-type four-wheeled passenger vehicle.

The control device of FIG. 1 includes a control unit 2. The control unit 2 includes a plurality of electronic control units (ECUs) 20 to 29 communicably connected by an in-vehicle network. Each ECU includes a processor represented by a central processing unit (CPU), a storage device such as a semiconductor memory or the like, an interface with an external device, and the like. In the storage device, programs executed by the processor, data used for processing performed by the processor, and the like are stored. Each ECU may include a plurality of processors, storage devices, interfaces, and the like. In addition, the configuration of the control device of FIG. 1 may be a computer that implements the invention according to the programs.

Hereinafter, functions and the like assigned to each of the ECUs 20 to 29 will be described. Note that the number of ECUs and the functions assigned to the ECUs can be designed as appropriate, and can be subdivided or integrated, when compared with the present embodiment.

The ECU 20 performs control related to driving assistance and automated driving of the vehicle 1. In driving assistance, at least one of the steering and the acceleration/deceleration of the vehicle 1 is automatically controlled. In automated driving, both the steering and the acceleration/deceleration of the vehicle 1 is automatically controlled.

The ECU 21 controls an electric power steering device 3. The electric power steering device 3 includes a mechanism that steers front wheels in response to a driver's driving operation (steering operation) on a steering wheel 31. In addition, the electric power steering device 3 includes a motor that exerts a driving force for assisting in steering operation or automatically steering the front wheels, and a sensor that detects a steering angle. In a case where the driving state of the vehicle 1 is automated driving, the ECU 21 automatically controls the electric power steering device 3 in response to an instruction from the ECU 20 and controls the advancing direction of the vehicle 1.

The ECUs 22 and 23 control sensing units 41 to 43 that detect surrounding situations of the vehicle, and performs information processing of the detection results. The sensing unit 41 is a camera that captures images of the front of the vehicle 1 (hereinafter referred to as a camera 41 in some cases) and is attached to the vehicle interior side of the windshield at the front of the roof of the vehicle 1 in the present embodiment. By analyzing the images captured by the camera 41, it is possible to extract a contour of a target object or extract a division line (white line or the like) of a lane on a road.

The sensing unit 42 is a light detection and ranging (LIDAR), detects a target object around the vehicle 1, and measures a distance to the target object. In the present embodiment, five sensing units 42 are provided, including one at each corner portion of a front part of the vehicle 1, one at the center of a rear part of the vehicle 1, and one at each lateral side of the rear part of the vehicle 1. The sensing unit 43 is a millimeter-wave radar (hereinafter referred to as a radar 43 in some cases), detects a target object in the surroundings of the vehicle 1, and measures a distance to the target object. In the present embodiment, five radars 43 are provided, including one at the center of the front part of the vehicle 1, one at each corner portion of the front part of the vehicle 1, and one at each corner portion of the rear part of the vehicle 1.

The ECU 22 controls one camera 41 and each sensing unit 42, and performs information processing on detection results. The ECU 23 controls the other camera 41 and each radar 43, and performs information processing on detection results. Since two sets of devices for detecting the surrounding situations of the vehicle are provided, the reliability of the detection results can be improved, and since different types of sensing units such as cameras and radars are provided, the surrounding environment of the vehicle can be multilaterally analyzed.

The ECU 24 controls a gyro sensor 5, a global positioning system (GPS) sensor 24b, and a communication device 24c, and performs information processing on detection results or communication results. The gyro sensor 5 detects a rotational motion of the vehicle 1. The course of the vehicle 1 can be determined based on the detection results of the gyro sensor 5, the wheel speed, and the like. The GPS sensor 24b detects the current position of the vehicle 1. The communication device 24c performs wireless communication with a server that provides map information, traffic information, and weather information, and acquires these pieces of information. The ECU 24 is capable of accessing a map information database 24a constructed in the storage device, and the ECU 24 searches for routes from the current position to a destination, etc. Note that a database of the above-described traffic information, weather information, and the like may be constructed in the database 24a.

The ECU 25 includes a communication device 25a for vehicle-to-vehicle communication. The communication device 25a performs wireless communication with other vehicles in the vicinity to exchange information between the vehicles. The communication device 25a has various communication functions, and for example, has a dedicated short range communication (DSRC) function or a cellular communication function. The communication device 25a may be configured as a telematics communication unit (TCU) including transmission/reception antennas. DSRC is a unidirectional or bidirectional short range to middle range communication function, and enables high-speed data communication between vehicles or between roads and vehicles.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine in response to a driver's driving operation (accelerator operation or acceleration operation) detected by an operation detection sensor 7a provided on an accelerator pedal 7A, and switches the gear ratio of the transmission based on information such as a vehicle speed detected by a vehicle speed sensor 7c and the like. In a case where the driving state of the vehicle 1 is automated driving, the ECU 26 automatically controls the power plant 6 in response to an instruction from the ECU 20 and controls the acceleration/deceleration of the vehicle 1.

The ECU 27 controls lighting devices (headlights, taillights, and the like) including direction indicators 8 (blinkers). In the example of FIG. 1, the direction indicators 8 are provided in the front part, the door mirrors, and the rear part of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of the driver's seat, and constitutes an instrument panel or the like. Note that, although the sound and the display have been given as examples here, information may be notified by vibration or light. In addition, information may be notified by using a combination of some of sound, display, vibration, and light. Furthermore, depending on the level (for example, the degree of urgency) of information that is to be notified, the combination may be changed or the notification mode may be changed. In addition, the display device 92 includes a navigation device.

An input device 93 is a switch group that is arranged at a position where the driver can operate and is used to input an instruction to the vehicle 1. The input device 93 may also include a sound input device.

The ECU 29 controls a brake device 10 and a parking brake (not illustrated). The brake device 10 is, for example, a disc brake device, and is provided to each wheel of the vehicle 1 to decelerate or stop the vehicle 1 by applying resistance to the rotation of the wheel. The ECU 29 controls the operation of the brake device 10 according to the driver's driving operation (brake operation) detected by an operation detection sensor 7b provided on a brake pedal 7B, for example. In a case where the driving state of the vehicle 1 is automated driving, the ECU 29 automatically controls the brake device 10 in response to an instruction from the ECU 20 and controls the deceleration and stop of the vehicle 1. The brake device 10 and the parking brake can be operated to maintain a stopped state of the vehicle 1. In addition, in a case where the transmission of the power plant 6 includes a parking lock mechanism, the parking lock mechanism can also be operated to maintain the stopped state of the vehicle 1.

Control related to driving assistance of the vehicle 1 performed by the ECU 20 will be described. In driving assistance, the ECU 20 automatically controls at least one of the steering and the acceleration/deceleration of the vehicle 1. In automatic control, the ECU 20 acquires information (external environment information) related to the surrounding situations of the vehicle 1 from the ECUs 22 and 23, instructs the ECUs 21, 26, and 29 based on the acquired information, and controls the steering and the acceleration/deceleration of the vehicle 1. Note that even in a case where both the steering and the acceleration/deceleration of the vehicle 1 are controlled by the ECU 20, the control is performed as control related to driving assistance when the driver is requested to monitor the state of the surroundings or the system. Although the case where the ECU 20 performs control related to driving assistance of the vehicle 1 has been described above, the ECU 20 may perform the control related to automated driving of the vehicle 1. In this case, when the destination and automated driving are instructed by the driver, the ECU 20 automatically controls traveling of the vehicle 1 toward the destination according to the guidance route searched by the ECU 24. Also in this case, as in the case of performing control related to driving assistance, the ECU 20 acquires information (external environment information) related to the surrounding situations of the vehicle 1 from the ECUs 22 and 23, and instructs the ECUs 21, 26, and 29 based on the acquired information to control the steering and the acceleration/deceleration of the vehicle 1. The present embodiment can be applied to both a case where the ECU 20 performs control related to driving assistance of the vehicle 1 and a case where the ECU 20 performs control related to automated driving of the vehicle 1.

Figure 2:
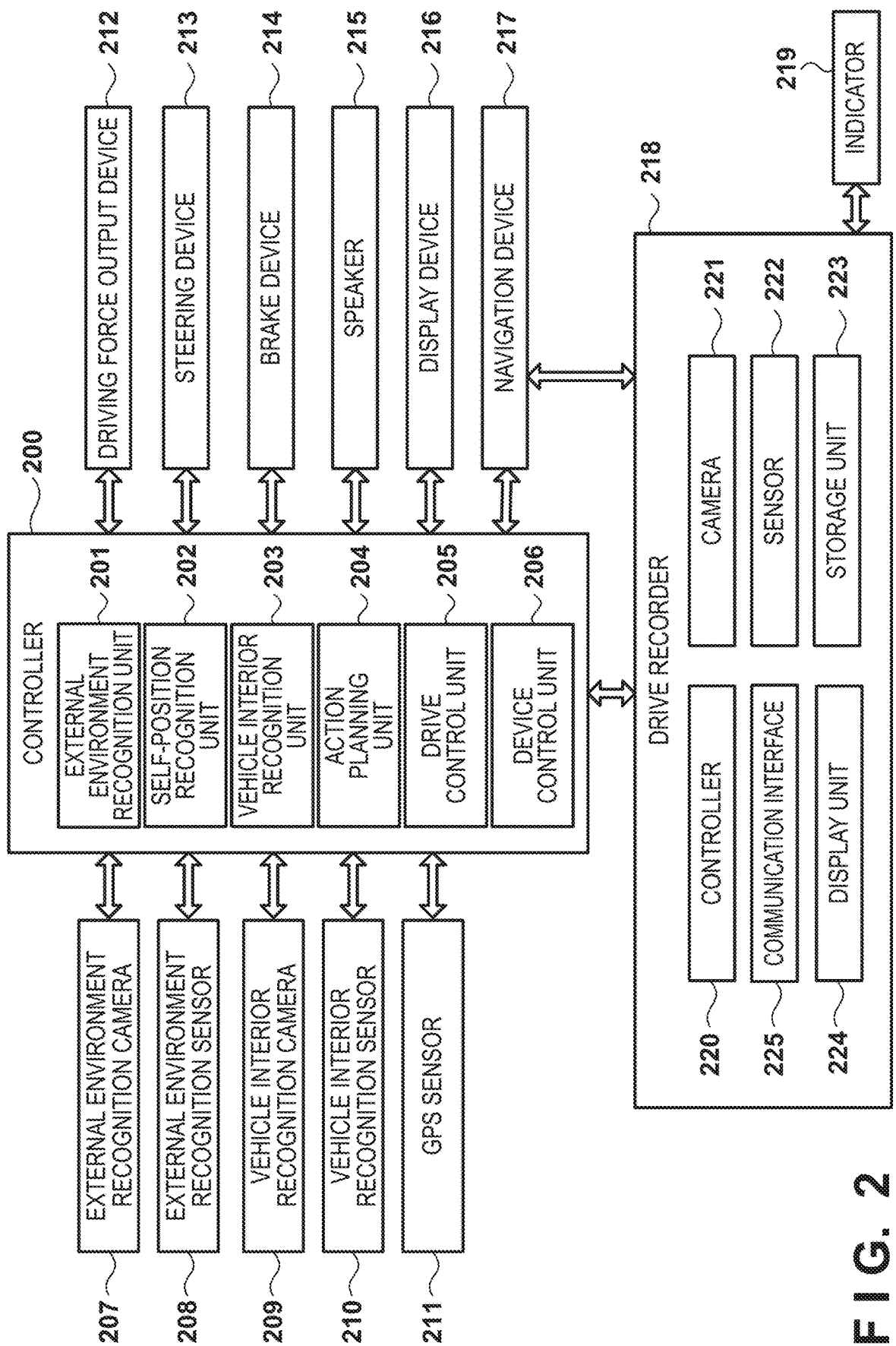
FIG. 2 is a diagram illustrating functional blocks of a control unit.

FIG. 2 is a diagram illustrating functional blocks of the control unit 2. The controller 200 corresponds to the control unit 2 in FIG. 1, and includes an external environment recognition unit 201, a self-position recognition unit 202, a vehicle interior recognition unit 203, an action planning unit 204, a drive control unit 205, and a device control unit 206. Each block is implemented by one ECU or a plurality of ECUs illustrated in FIG. 1.

The external environment recognition unit 201 recognizes the external environment information of the vehicle 1 based on signals from an external environment recognition camera 207 and an external environment recognition sensor 208. Here, the external environment recognition camera 207 is, for example, the camera 41 in FIG. 1, and the external environment recognition sensor 208 is, for example, the sensing units 42 and 43 in FIG. 1. The external environment recognition unit 201 recognizes, for example, scenes such as an intersection, a railroad crossing, and a tunnel, free spaces such as a road shoulder, and behaviors (speeds or advancing directions) of other vehicles based on signals from the external environment recognition camera 207 and the external environment recognition sensor 208. The self-position recognition unit 202 recognizes the current position of the vehicle 1 based on signals from a GPS sensor 211. Here, the GPS sensor 211 corresponds to, for example, the GPS sensor 24b in FIG. 1.

The vehicle interior recognition unit 203 identifies a passenger of the vehicle 1 and recognizes a state of the passenger based on signals from a vehicle interior recognition camera 209 and a vehicle interior recognition sensor 210. The vehicle interior recognition camera 209 is, for example, a near-infrared camera installed on the display device 92 in the vehicle interior of the vehicle 1, and detects, for example, the direction of the line of sight of the passenger. In addition, the vehicle interior recognition sensor 210 is, for example, a sensor that detects a biological signal of the passenger. Based on these signals, the vehicle interior recognition unit 203 recognizes that the passenger is in a dozing state, a state during work other than driving, and the like.

The action planning unit 204 performs a travel plan for planning a travel route of the vehicle 1, such as an optimal route and a risk avoidance route, based on results of recognition by the external environment recognition unit 201 and the self-position recognition unit 202. The action planning unit 204 performs, for example, entry determination based on a start point or an end point of an intersection, a railroad crossing, or the like, and an action plan based on behavior predictions of other vehicles. The drive control unit 205 controls a driving force output device 212, a steering device 213, and a brake device 214 based on the action plan by the action planning unit 204. Here, the driving force output device 212 corresponds to, for example, the power plant 6 in FIG. 1, the steering device 213 corresponds to the electric power steering device 3 in FIG. 1, and the brake device 214 corresponds to the brake device 10.

The device control unit 206 controls a device connected to the controller 200. For example, the device control unit 206 controls a speaker 215 to output a predetermined sound message such as a message for warning or navigation. In addition, for example, the device control unit 206 controls a display device 216 to display a predetermined interface screen. The display device 216 corresponds to, for example, the display device 92. In addition, for example, the device control unit 206 controls a navigation device 217 and acquires setting information in the navigation device 217.

The controller 200 may appropriately include functional blocks other than those illustrated in FIG. 2, and may include, for example, an optimal route calculation unit that calculates an optimal route to a destination based on map information acquired via the communication device 24c. In addition, the controller 200 may acquire information from a device other than the camera and the sensor illustrated in FIG. 2, and for example, may acquire information of other vehicles via the communication device 25a. In addition, the controller 200 receives detection signals from not only the GPS sensor 211 but also various sensors provided in the vehicle 1. For example, the controller 200 receives detection signals of door opening/closing sensors or door lock mechanism sensors provided in the door portions of the vehicle 1 via ECUs configured in the door portions. As a result, the controller 200 can detect unlocking of a door or an opening/closing operation of a door.

In the present embodiment, a drive recorder 218 is attached to the vehicle 1. The drive recorder 218 may be built in the vehicle 1 or may be attached later. In the present embodiment, as illustrated in FIG. 3, the drive recorder 218 is attached to, for example, the upper part of the windshield and the back side of the rear-view mirror. For example, the drive recorder 218 stores moving image data captured by a camera 221 in a storage unit 223 with an impact equal to or greater than a threshold value on the vehicle 1 as a trigger by a sensor 222. In FIG. 2, the drive recorder 218 is illustrated as a configuration in which the camera 221 is built in, but may be configured as a separate type in which the main body and the camera 221 are separated.

The controller 220 includes a processor and a memory, and integrally controls the drive recorder 218. For example, the controller 220 starts capturing by the camera 221 or stores captured image data in the storage unit 223 based on detection signals from the sensor 222. The operations of the present embodiment are implemented, for example, by the processor of the controller 220 reading and executing a program stored in the memory. That is, the controller 220 and the drive recorder 218 can be computers for carrying out the invention.

As illustrated in FIG. 3, the camera 221 includes a camera 301 configured on the front surface of the drive recorder 218 and a camera 302 configured on the rear surface of the drive recorder 218. The camera 301 is a wide-angle camera capable of capturing the front of the vehicle 1, and the camera 302 is a fisheye camera capable of capturing the rear of the vehicle. As the fisheye camera, for example, one fisheye camera installed horizontally may be used. In addition, as the fisheye camera, for example, a fisheye camera having an angle of view of 220 to 240 degrees is used. In FIG. 3, one camera 301 and one camera 302 are illustrated for illustration, but a plurality of cameras may be configured. An image 401 in FIG. 4 illustrates an example of an image captured by the camera 301. Images 402, 403, and 404 in FIG. 4 are examples of images captured by the camera 302. As illustrated in FIG. 4, the images 402, 403, and 404 include an image of the inside of the vehicle 1 and an outside scenery image seen from the vehicle windows. The image 402 illustrates an image obtained by capturing the right rear of the drive recorder 218, and the image 403 illustrates an image obtained by capturing the left rear of the drive recorder 218. In addition, the image 404 illustrates an image obtained by capturing the rear side of the drive recorder 218. The camera 221 transmits captured image data to the controller 220 at a predetermined frame rate, and the controller 220 stores the captured image data in the storage unit 223 in the form of a video file created in a predetermined format such as MP4 based on the transmitted image data.

The sensor 222 includes, for example, an acceleration sensor, a motion sensor, and a GPS sensor. The controller 220 acquires position information, vehicle speed information, acceleration information, time information, and the like of the vehicle 1 based on detection signals from the sensor 222, and performs capturing control of the camera 221 and display control of captured images based on each acquired information.

The storage unit 223 is, for example, a secure digital (SD) card, and is configured to be able to store a predetermined volume of moving image data. In addition, in the present embodiment, the storage unit 223 stores a generated mask filter described later. A display unit 224 is, for example, a liquid crystal monitor, and displays various user interface screens such as a setting screen. In addition, the drive recorder 218 may be configured to cooperate with the navigation device 217. For example, setting of the drive recorder 218 may be performed by a setting operation on a screen displayed by the navigation device 217. A communication interface 225 enables communication with the controller 200 of the vehicle 1 or each electric unit. For example, the drive recorder 218 enables communication with the controller 200 or the brake device 214 by Bluetooth (registered trademark)/WiFi (registered trademark). In addition, the drive recorder 218 may be configured to be able to communicate with devices other than the controller 200 of the vehicle 1 or each electric unit, for example, a portable terminal such as a smartphone held by a driver.

Figure 11:
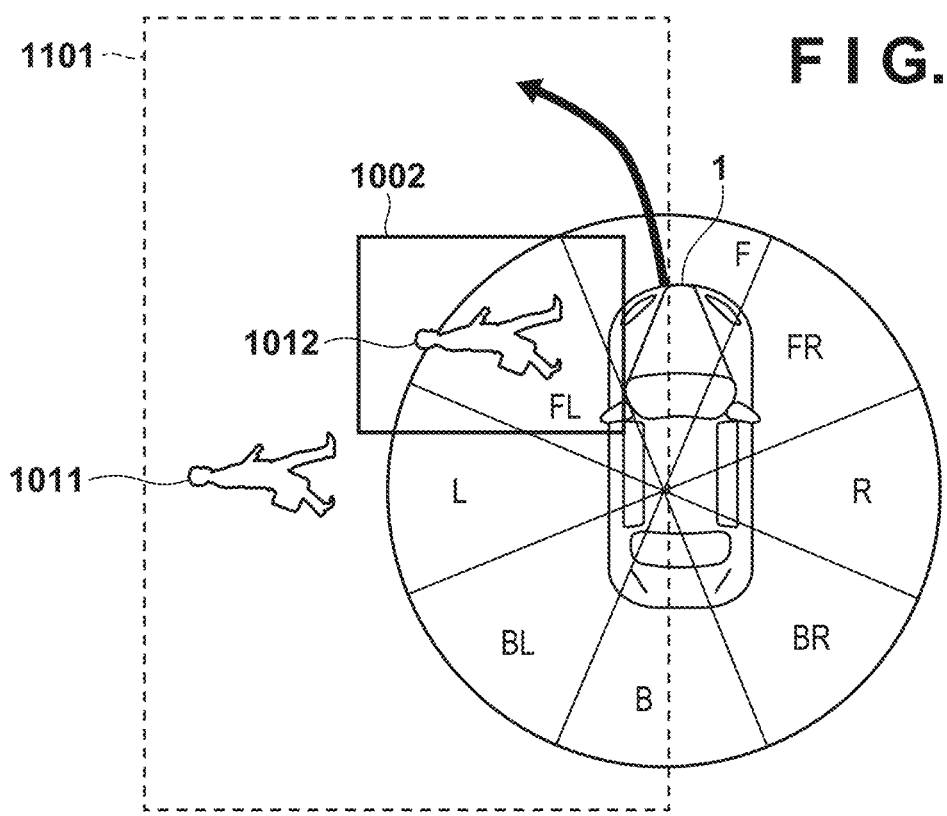
FIG. 11 is a diagram for explaining determination of an object to be a risk target.
Figure 12:
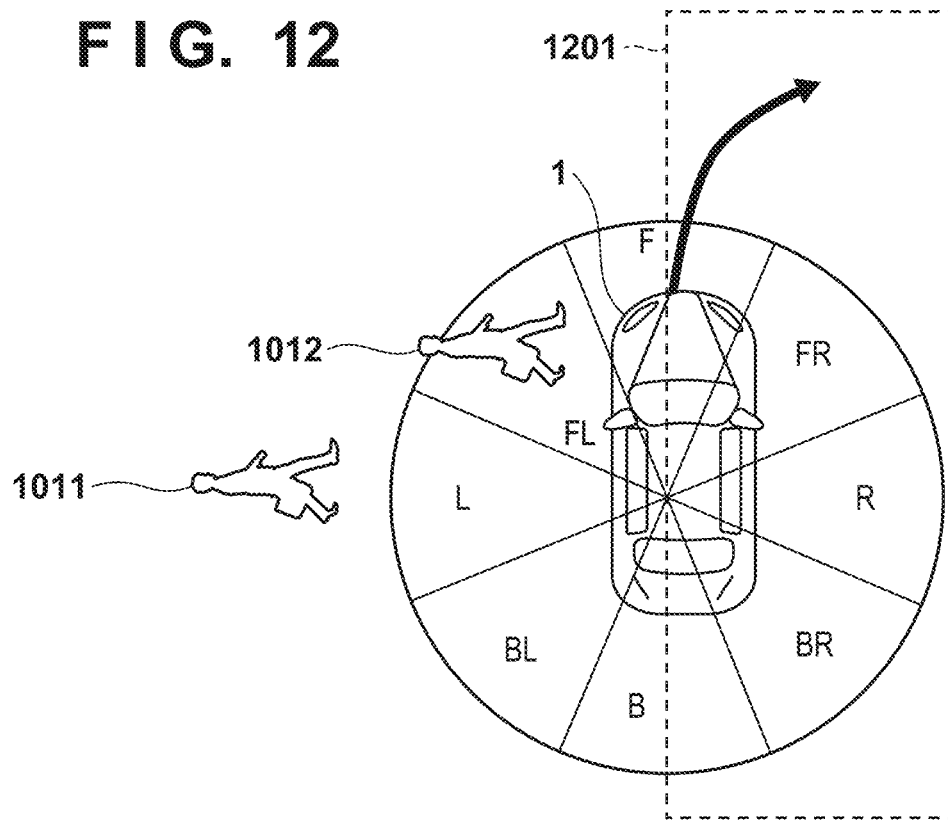
FIG. 12 is a diagram for explaining determination of an object to be a risk target.

As illustrated in FIG. 3, an indicator 219 is provided on the upper portion of the dashboard, and is configured to be able to individually light display regions corresponding to the eight directions around the vehicle 1 with light-emitting diodes (LEDs) or the like. As illustrated in FIGS. 11 and 12, the eight directions around the vehicle 1 are a front side (F), a front right side (FR), a front left side (FL), a right side (R), a left side (L), a rear side (B), a rear right side (BR), and a rear left side (BL) of the vehicle 1. The glassy circular region on the surface of the indicator 219 is divided in the above-described eight directions, and in each region, for example, a yellow/red variable LED 304 is embedded. When the LED 304 emits light, it looks to the driver that a fan-shaped portion corresponding to the LED 304 is emitting light. The drive recorder 218 is communicable with the indicator 219 via the communication interface 225. For example, the drive recorder 218 determines a risk target object outside the vehicle 1 based on image data captured by the camera 221, and causes the LED 304 corresponding to the direction in which the risk target object exists to emit light of a predetermined color. The determination of the risk target object will be described later. The drive recorder 218 may appropriately include functional blocks other than those illustrated in FIG. 2, and may include, for example, a microphone for inputting sound.

In the present embodiment, a risk target object outside the vehicle 1 is determined based on an image captured by the drive recorder 218, and the determination result is notified to a passenger such as a driver. The drive recorder 218 captures not only the front of the vehicle 1 but also the inside of the vehicle 1. Thus, the images captured by the drive recorder 218 include not only the inside of the vehicle 1 but also the outside scenery seen from the vehicle windows. In the present embodiment, based on such features of the images captured by the drive recorder 218, risk target objects not only in front of the vehicle 1 but also in the rear of the vehicle 1 are determined. In addition, at that time, it is possible to appropriately specify the outside scenery seen from the vehicle windows by processing described later in the images captured by the drive recorder 218.

Figure 5:
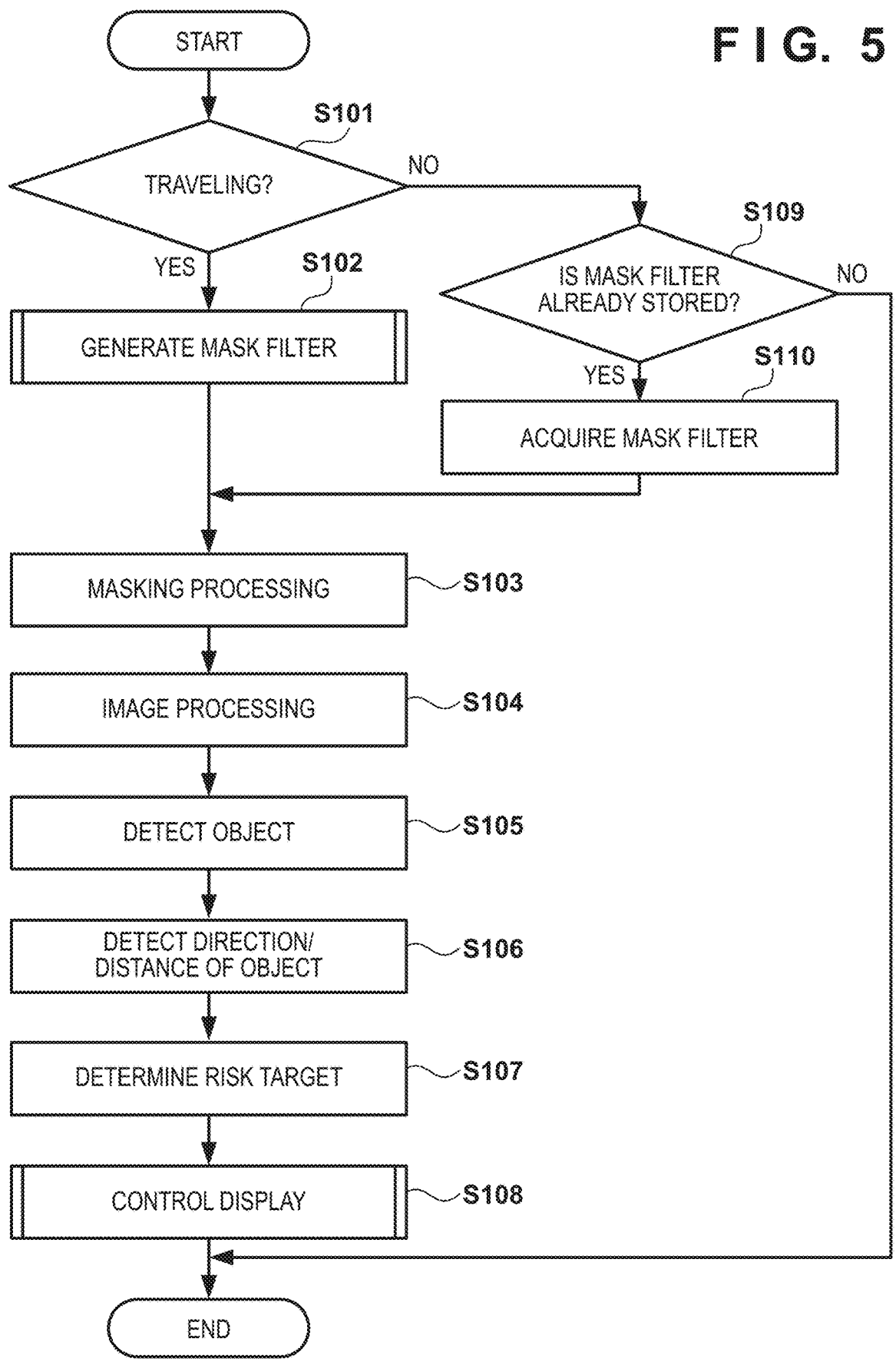
FIG. 5 is a flowchart illustrating display control processing.

FIG. 5 is a flowchart illustrating the display control processing of the drive recorder 218 according to the present embodiment. The processing of FIG. 5 is implemented, for example, by the processor of the controller 220 of the drive recorder 218 reading and executing a program stored in the memory. The processing of FIG. 5 is started, for example, when the driver gets on the vehicle 1 and starts driving. In addition, the driver may set, on the setting screen of the drive recorder 218, that the notification of risk target objects outside the vehicle 1 is performed by the drive recorder 218, and the processing of FIG. 5 may be started with the setting as a trigger.

In S101, the controller 220 determines whether or not the vehicle 1 is traveling. For example, the controller 220 determines whether or not the vehicle 1 is traveling based on detection signals from the sensor 222 or captured image data of the camera 221. In a case where it is determined that the vehicle 1 is traveling, the process proceeds to S102, and in a case where it is determined that the vehicle 1 is not traveling, the process proceeds to S109. The case where it is determined that the vehicle 1 is not traveling includes, for example, a temporary stop at an intersection. In the present embodiment, it is determined whether or not the vehicle 1 is traveling in S101, and the determination may be performed based on conditions of various types of vehicle information. For example, the determination in S101 may be made based on whether or not the speed of the vehicle 1 is equal to or less than a predetermined value. In S102, a mask filter is generated.

Figure 6:
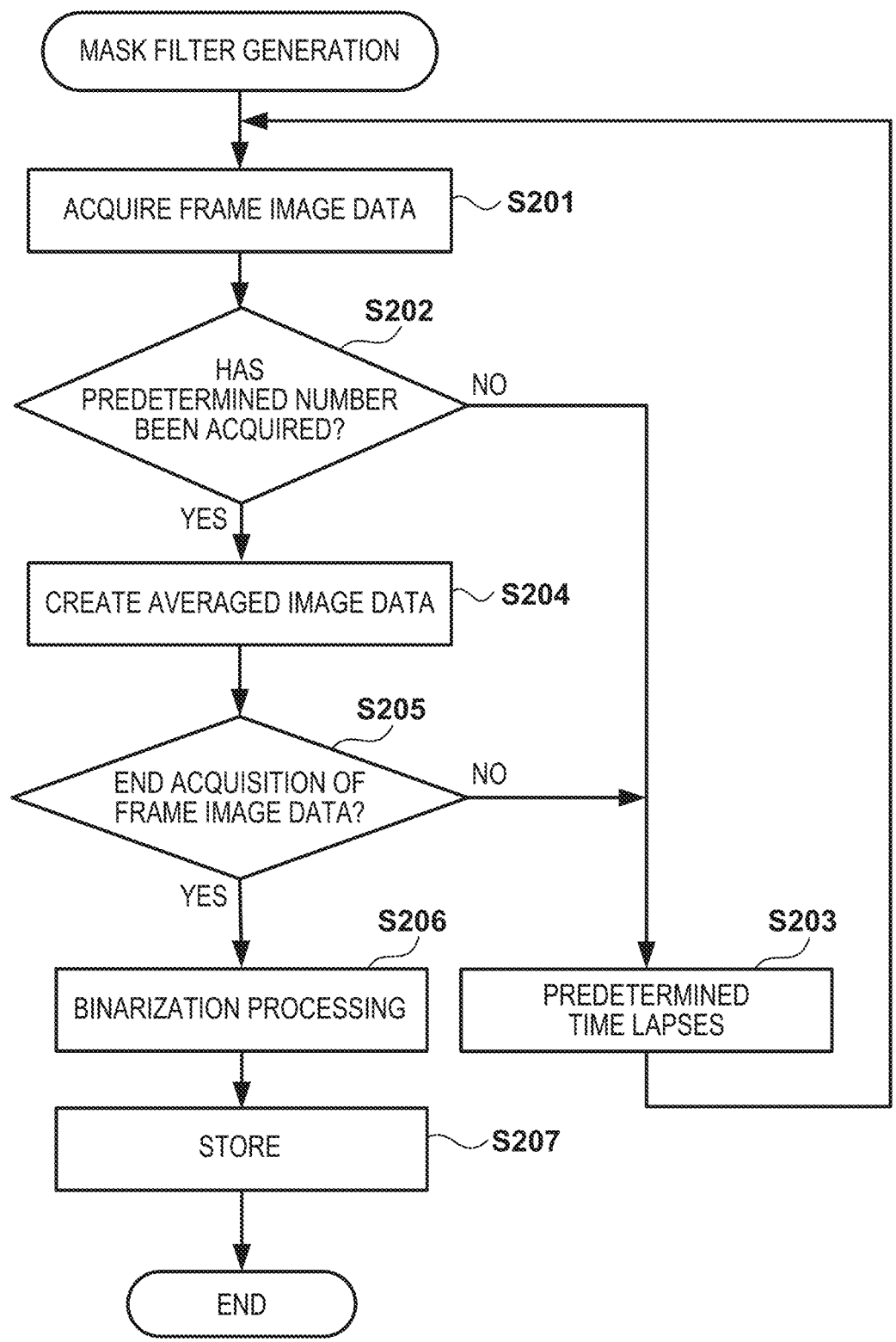
FIG. 6 is a flowchart illustrating mask filter generation processing.

FIG. 6 is a flowchart illustrating the mask filter generation processing in S102. In S201, the controller 220 acquires frame image data from the camera 221. In step S202, the controller 220 determines whether or not a predetermined number of pieces of frame image data have been acquired. In a case where it is determined that the predetermined number of pieces of frame image data have not been acquired, the controller 220 waits for a lapse of a predetermined time in step S203, and acquires frame image data again in step S201. The predetermined time in S203 corresponds to the frame rate. That is, the predetermined number of pieces of frame image data are acquired in time series at predetermined time intervals by the processing of S201 to S203. After S202, in S204, the controller 220 creates averaged image data based on the predetermined number of pieces of frame image data acquired in S201 to S203.

Then, in S205, the controller 220 determines whether or not to end the acquisition of frame image data. For example, in a case where it is determined that the averaged image data sufficient for generating the mask filter has been created, the controller 220 determines to end the acquisition of the frame image data. This determination criterion will be described later. In a case where it is determined in S205 that the acquisition of frame image data is not ended, the controller 220 waits for a lapse of the predetermined time in S203, and acquires frame image data again in S201.

Figure 8:
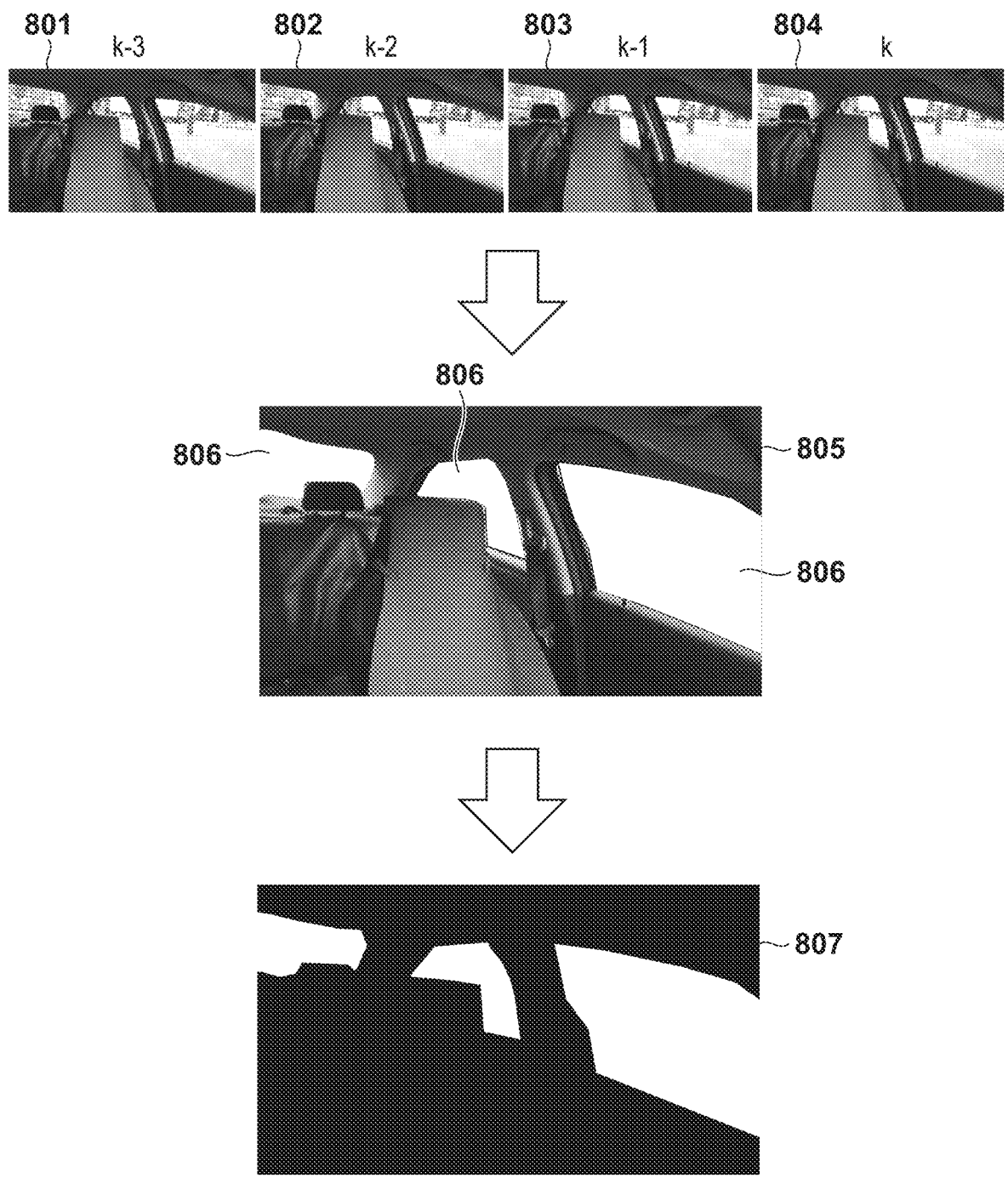
FIG. 8 is a diagram for explaining an averaged frame image and a mask filter.

FIG. 8 is a diagram for explaining the operations of S201 to S205. FIG. 8 illustrates images in which the left rear of the drive recorder 218 is captured by the camera 302. Frame images 801 to 804 illustrate frame images captured in time series at predetermined time intervals by the camera 302. The frame image 801 is the frame image acquired in S201 at the frame image acquisition time k−3. The frame image 802 is the frame image acquired in S201 at the frame image acquisition time k−2 after the lapse of the predetermined time in S203. The frame image 803 is the frame image acquired in S201 at the frame image acquisition time k−1 after the lapse of the predetermined time in S203. The frame image 804 is the frame image acquired at the frame image acquisition time k after the lapse of the predetermined time in S203. That is, with the lapse of the predetermined time, the frame images 801 to 804 are sequentially acquired in S201. Note that, here, the predetermined number determined in S202 is "two". In addition, each frame image is described as, for example, a red, green, blue (RGB) image, and the pixel value is expressed as each RGB value. The controller 220 creates an averaged image by sequentially using the frame images 801 to 804. That is, the controller 220 calculates an average value of RGB values for each pixel of a predetermined number of acquired frame images.

For example, when the frame image 801 and the frame image 802 are acquired, it is determined that a predetermined number of frame images have been acquired in S202, and an averaged image is created in S204 by using the frame image 801 and the frame image 802. Then, after S203, when the frame image 803 is acquired in S201, it is determined in S202 that a predetermined number of frame images have been acquired. That is, it is determined that a predetermined number of frame images have been acquired in S202 by acquiring two frame images of the averaged image already created in S204 and the frame image 803 acquired in S201 this time. Then, the averaged image is created in S204 by using the averaged image already created in S204 and the frame image 803.

Then, after S203, when the frame image 804 is acquired in S201, it is determined in S202 that a predetermined number of frame images have been acquired. That is, it is determined that a predetermined number of frame images have been acquired in S202 by acquiring two frame images of the averaged image already created in S204 and the frame image 804 acquired in S201 this time. Then, the averaged image is created in S204 by using the averaged image already created in S204 and the frame image 804.

That is, in the present embodiment, the moving average of each pixel value for each predetermined number is calculated for the frame images acquired at predetermined time intervals. The averaged image 805 indicates the averaged image created when the frame image 804 has been acquired in the above case. The pixel values of the averaged image created by the processing of FIG. 6 exhibit the following tendencies.

As illustrated in the frame images 801 to 804, the inside of the image includes a region where the space inside the vehicle is captured and a region where an outside scenery seen from the vehicle windows is captured. The region obtained by capturing the space inside the vehicle includes, for example, images of seats and doors, and the region obtained by capturing an outside scenery seen from the vehicle windows includes, for example, images of external pedestrians and external vehicles. Here, since the image of the region where the space inside the vehicle is captured may be regarded as having substantially no temporal change of the targets to be captured, the pixel value of each pixel is substantially constant over the frame images with the lapse of time. On the other hand, in the image of the region where the outside scenery seen from the vehicle windows is captured, the targets to be captured randomly changes with the lapse of time, and thus, the variation in the pixel value of each pixel increases over the frame images 801 to 804. Since there are such tendencies, the pixel values in the region where the space inside the vehicle in the averaged image is captured are the pixel values based on the targets to be captured. On the other hand, the pixel values in the region where the outside scenery seen from the vehicle windows in the averaged image is captured get closer to the maximum value or the minimum value. For example, the pixel values get closer to the white color of the maximum value of the RGB pixel values=(255, 255, 255) depending on the addition in averaging (whitening). In addition, for example, the pixel values get closer to the black color of the minimum value of the RGB pixel values=(0, 0, 0) depending on the addition in averaging. In the present embodiment, a description will be given on the assumption that the pixel values in the region where the outside scenery seen from the vehicle windows in the averaged image is captured get closer to the maximum value.

A region 806 in the averaged image 805 in FIG. 8 indicates that whitening has been performed by repeatedly creating the averaged image in S204. Note that, although the averaged image 805 in FIG. 8 illustrates a state of being completely whitened, there may be a state of not being completely whitened depending on the number of times of processing in S204.

As a criterion for determining the end of the acquisition of frame image data in S205, for example, an RGB value that can be regarded as whitening may be set as a threshold value, and in a case where the RGB value of the region where the RGB value fluctuates (for example, region 806) is equal to or greater than the threshold value, it may be determined that whitening has been performed, and it may be determined that the acquisition of frame image data is to be ended. The threshold value may be determined, for example, by determining in advance a relationship between the number of times of overlapping of pixels in which colors randomly appear and whitening.

In S206, the controller 220 performs binarization processing on the averaged image created in S204. The threshold value of the pixel value in performing binarization may be the same as or different from the threshold value used in S205. For example, the threshold value for regarded as whitening in S205 may be made larger than the threshold value for binarization in S206. With such a configuration, it is possible to more appropriately specify a region of an outside scenery and a region obtained by capturing the space inside the vehicle which is a target of masking processing.

A binarized image 807 in FIG. 8 illustrates a frame image subjected to the binarization processing in S206. For example, as illustrated in the binarized image 807, the region corresponding to the region 806 is binarized as the value "0", and the other regions are binarized as the value "1". In S207, the controller 220 generates a mask filter based on the region corresponding to the value "1" in the binarized image 807 subjected to the binarization processing in S206, and stores the mask filter in the storage unit 223. Then, the processing in FIG. 6 ends.

FIG. 5 is referred to again. After the mask filter is generated in S102, in S103, the controller 220 performs masking processing on the image data captured by the camera 221 by using the mask filter generated in S102. A masked image 901 in FIG. 9 illustrates an image on which masking processing is performed by the mask filter generated in S102. As illustrated in the masked image 901, the image other than the outside scenery seen from the vehicle windows is in a state of being masked. Then, in S104, the controller 220 performs image processing on the masked image 901. Here, the image processing performed is image processing for appropriately detecting moving objects in the subsequent stage, and is, for example, brightness adjustment. That is, in the masked image 901, since the outside scenery seen from the vehicle windows is captured, there is a possibility that, for example, overexposure occurs in a part of the image and gradation is lost depending on the environment at that time. When the gradation is lost, there is a possibility that objects to be detected cannot be detected in the detection of moving objects. Thus, in the present embodiment, level correction or tone curve adjustment are performed on the masked image 901 to prevent loss of gradation.

In S104, for example, the following image processing may be performed. The controller 220 detects a brightness distribution in the non-masked region (that is, the outside scenery seen from the vehicle windows) in the masked image 901. This detection result is extracted as a histogram distribution of the number of pixels for each brightness. Then, in a case where the brightness distribution is biased to the brightness minimum value side or biased to the brightness maximum value side, the controller 220 eliminates the bias so that the brightness distribution is distributed from the minimum value to the maximum value. As a result, the brightness of the non-masked region in the masked image 901 is improved, and moving objects can be appropriately detected.

In S105, the controller 220 performs object detection based on the masked image 901. Note that, in the object detection, for example, a neural network trained so as to be able to detect moving objects (traffic participants) such as a pedestrian or a bicycle is used. In the detected image 902, a pedestrian 903 is detected as a moving object. The neural network used here is a neural network trained by using images corresponding to conditions of the image processing of S104, for example, images having a predetermined brightness distribution.

In the present embodiment, as illustrated in the masked image 901, detection of moving objects is performed by using image data in which the space inside the vehicle is masked. There is a possibility that there is a moving object in the space inside the vehicle, and for example, there is a possibility that an accessory or the like suspended near the window portion swings due to vibration. In a case where image data that has not been subjected to masking processing is used, there is a possibility that such an object is erroneously detected as a moving object such as a pedestrian or a bicycle outside the vehicle. However, in the present embodiment, since the region other than the outside scenery seen from the vehicle windows is masked based on the frame image data from the camera 221, it is possible to prevent an object in the space inside the vehicle as described above from being erroneously detected as a moving object outside the vehicle.

In S106, the controller 220 detects the direction and the distance of the object detected in S105 from the vehicle 1. For example, the controller 220 may detect the direction and the distance of the moving object based on an optical flow using a plurality of pieces of frame image data over time, the horizontal direction position of the object on the image, or the size of the detection box of the object.

Figure 10:
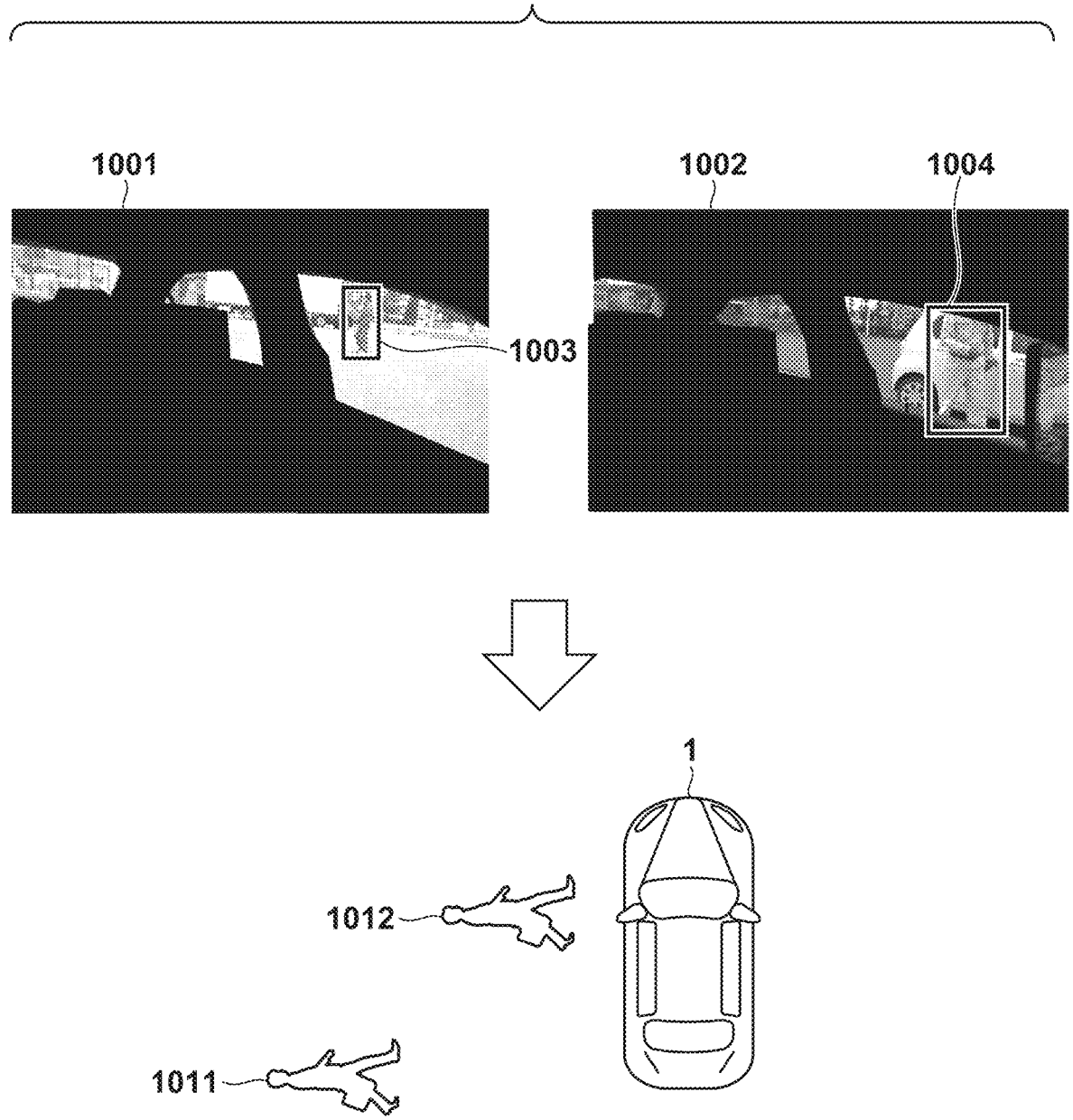
FIG. 10 is a diagram illustrating a state in which a pedestrian is recognized around the vehicle.

FIG. 10 is a diagram illustrating a case where a frame image 1001 and a frame image 1002 are acquired as the vehicle 1 moves. The controller 220 detects the pedestrian 1003 from the frame image 1001 and detects the pedestrian 1004 from the frame image 1002. Then, when acquiring the frame image 1001 and the frame image 1002, the controller 220 recognizes that the pedestrian 1011 and the pedestrian 1012 are located with respect to the vehicle 1 as illustrated in the lower part of FIG. 10. The pedestrians 1011 and 1012 correspond to the pedestrians 1003 and 1004, respectively.

In S107, the controller 220 determines moving objects to be risk targets (risk target objects) among the moving objects detected in S105 based on the vehicle information of the vehicle 1. For example, the controller 220 determines risk target objects based on each behavior of the vehicle 1 and the moving objects. In a case where the vehicle 1 is traveling straight ahead, the controller 220 determines a risk of collision from the moving direction and the estimated speed of a moving object recognized from the captured images of the right lateral side and the left lateral side of the vehicle 1 and the vehicle speed of the vehicle 1, and determines a moving object determined to have a high risk as a risk target object. In addition, in a case where the vehicle 1 is turning, the determination target region of the risk target object is limited to the turning direction.

FIG. 11 is a diagram illustrating a case where the controller 220 recognizes moving objects as illustrated in the lower part of FIG. 10 and the vehicle 1 turns in the left direction. In this case, the controller 220 sets the risk extraction range 1101 as a target region for determination in S107. As illustrated in FIG. 11, the direction in which the vehicle 1 turns in the left direction and the moving direction of the pedestrian 1012 overlap. Furthermore, in a case where the controller 220 determines that the risk of collision between the vehicle 1 and the pedestrian 1012 over time is high from the vehicle speed of the vehicle 1 and the estimated speed of the pedestrian 1012, the controller 220 determines the pedestrian 1012 as a risk target object. Meanwhile, the direction in which the vehicle 1 turns in the left direction and the moving direction of the pedestrian 1011 overlap each other. However, in a case where the controller 220 determines that the risk of collision between the vehicle 1 and the pedestrian 1011 is extremely low from the vehicle speed of the vehicle 1 and the estimated speed of the pedestrian 1011, the controller 220 does not determine the pedestrian 1011 as a risk target object.

FIG. 12 is a diagram illustrating a case where the controller 220 recognizes moving objects as illustrated in the lower part of FIG. 10 and the vehicle 1 turns in the right direction. In this case, the controller 220 sets the risk extraction range 1201 as a target region for determination in S107. That is, the determination of risk target objects is not performed for the pedestrians 1011 and 1012. As described above, since the target region for the determination in S107 is limited according to the turning direction of the vehicle 1, the processing load of the controller 220 can be reduced.

In S108, the controller 220 performs display control based on the determination results in S107.

Figure 7:
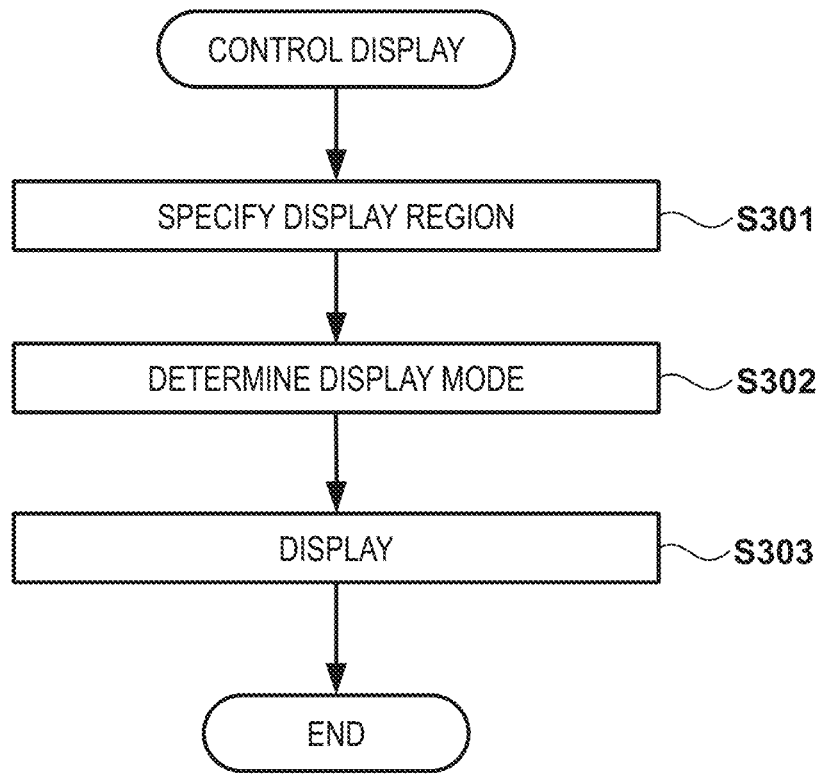
FIG. 7 is a flowchart illustrating display control processing.

FIG. 7 is a flowchart illustrating processing of the display control in S108. In S301, the controller 220 specifies the display region of the indicator 219. For example, the controller 220 specifies a display target region from among the eight divided display regions of the indicator 219 based on the direction and the distance of the moving object determined as the risk target object in S106 and S107. Here, the eight divided display regions are the front (F), the front right (FR), the front left (FL), the right (R), the left (L), the rear (B), the rear right (BR), and the rear left (BL). For example, as illustrated in FIG. 11, in a case where the pedestrian 1012 is determined as the risk target object, the controller 220 specifies a display region corresponding to the front left among the eight divided display regions of the indicator 219.

In S302, the controller 220 determines the display mode of the display region specified in S301. At that time, the controller 220 determines the display mode of the display region based on each behavior of the risk target object and the vehicle 1. For example, in a case where a time to collision (TTC) between the risk target object and the vehicle 1 is smaller than a threshold value, it is determined that the red LED indicating an emergency is turned on. On the other hand, in a case where the TTC is larger than the threshold value, it is determined that the yellow LED indicating a caution is turned on.

In S303, the controller 220 controls the indicator 219 to display the display region specified in S301 in the display mode determined in S302. After S303, the processing of FIG. 7 ends.

The specification of the display region in S301 and the determination of the display mode in S302 are not limited to the above. For example, in a case where the position of the risk target object is in front, the controller 220 specifies all the eight divided display regions of the indicator 219 as display regions and determines that the red LED is to be lighted in S301 and S302. With such a configuration, in particular, in a case where a risk target object exists in a region recognized as having a high risk, the degree of the warning display can be increased.

In addition, the controller 220 may specify the display region in S301 and determine the display mode in S302 further based on the information from the controller 200. For example, the controller 220 performs the processing of S301 and S302 by using the information of the direction of the line of sight of the driver transmitted from the vehicle interior recognition unit 203 of the controller 200. For example, in a case where the direction of the line of sight of the driver coincides with the risk target object for a predetermined time, the display of the display region corresponding to the risk target object may not be performed. With such a configuration, it is possible to prevent the driver's attention already directed to the risk target object from being reduced due to the display of the indicator 219.

In addition, the display control processing in S108 and FIG. 7 may be performed not only on the indicator 219 but also on the display unit 224, the display device 216, and the navigation device 217. In this case, a warning screen that can identify the direction and the distance of the risk target object as illustrated in FIGS. 11 and 12 may be displayed.

As described above, in a case where it is determined in S101 that the vehicle 1 is traveling, a mask filter is generated in S102. Meanwhile, in a case where it is determined in S101 that the vehicle 1 is not traveling, such as a temporary stop at an intersection, the controller 220 determines in S109 whether or not there is a mask filter already stored in the storage unit 223. Then, in a case where it is determined that there is a mask filter already stored, in S110, the controller 220 acquires the mask filter and performs the subsequent processing. On the other hand, in a case where it is determined that there is no mask filter already stored, the processing of FIG. 5 is ended. In that case, the processing from S101 may be repeated again.

As described above, according to the present embodiment, for example, moving objects (risk target objects) outside the vehicle 1 can be appropriately detected by using images captured by the drive recorder until the vehicle 1 arrives at the destination. In addition, display control of information related to the positions of the moving objects can be performed based on the detection results. As a result, the processing load on the controller 200 of the vehicle 1 can be reduced. Note that whether or not to perform the detection and the display control of the moving objects outside the vehicle 1 by using the captured images of the drive recorder 218 can be set on the setting screen of the drive recorder 218. In addition, such a setting may be performed even before or during the movement of the vehicle 1 to the destination. In addition, at least a part of the processing of the drive recorder 218 described in the present embodiment may be implemented by the controller 200. For example, the controller 220 may provide the image data subjected to the image processing up to S104 in FIG. 5 to the controller 200 and cause the controller 200 to perform the processing of S105 to S107 to more accurately detect the risk target objects. For example, even in a case where the vehicle 1 turns, risk target objects on the lateral side opposite to the turning direction may be determined.

In the present embodiment, the configuration in which the masking processing is performed on the image data captured by the camera 221 by the mask filter generated in S102 has been described. Note that the masking processing may be performed by another configuration as long as the configuration is based on the amount of change in pixel value between the plurality of images. For example, in a plurality of captured images sequentially captured over several seconds, masking processing may be performed by masking a region in which a variance of a change in pixel values is lower than a predetermined value (corresponding to a region in which the space inside the vehicle is captured). Even in that case, the same effects as those of the present embodiment can be obtained.

Summary of Embodiments

The image processing apparatus according to the above embodiments comprises: an image capturing unit (221) configured to capture an image including a region corresponding to an inside of a vehicle and a region corresponding to an outside of the vehicle; an acquisition unit (220, S102) configured to acquire a plurality of images captured by the image capturing unit at predetermined time intervals; a generation unit (220, S102) configured to generate a mask filter for masking the region corresponding to the inside of the vehicle in the image captured by the image capturing unit based on an amount of change in the plurality of images acquired by the acquisition unit; and a storage unit (223) configured to store the mask filter generated by the generation unit.

With such a configuration, for example, can appropriately detect external risk target objects based on captured images of the drive recorder 218.

In addition, the generation unit generates the mask filter based on an averaged image obtained from the plurality of images acquired by the acquisition unit. The generation unit acquires the averaged image by performing moving average along time series on a pixel value of each pixel of each of the plurality of images acquired by the acquisition unit. The generation unit generates the mask filter by performing binarization processing on the averaged image. The image processing apparatus further comprises a processing unit (220, S103) configured to perform masking processing on the image captured by the image capturing unit by using the mask filter stored in the storage unit.

With such a configuration, for example, can generate the mask filter for appropriately masking the region corresponding to the inside of the vehicle in the captured images of the drive recorder 218.

In addition, image processing is performed (S104) on the image on which the masking processing is performed by the processing unit. The image processing includes brightness adjustment.

With such a configuration, can make the masked image be an appropriate image for detecting external moving objects.

In addition, the image processing apparatus further comprises a detection unit (220, S105) configured to detect a moving object outside the vehicle based on the image on which the masking processing is performed by the processing unit.

With such a configuration, for example, can appropriately detect pedestrians outside the vehicle by using the captured images of the drive recorder 218.

in addition, the image processing apparatus further comprises a display control unit (220, S108) configured to control a display unit (224, 219, 217) based on a detection result by the detection unit. The display control unit controls the display unit to display information related to a position of the moving object detected by the detection unit with respect to the vehicle.

With such a configuration, for example, can display moving objects as warning by using the captured images of the drive recorder 218.

In addition, the display unit is configured to outside the image processing apparatus. The display unit is an indicator (219).

With such a configuration, for example, can control the display of the indicator by using the captured images of the drive recorder 218.

in addition, the image processing apparatus further comprises the display unit (224).

With such a configuration, for example, can display moving objects as warning on the drive recorder 218 by using the captured images of the drive recorder 218.

In addition, the acquisition unit acquires the plurality of images captured by the image capturing unit at the predetermined time intervals while the vehicle is traveling.

With such a configuration, can use frame images captured at a predetermined frame rate by the image capturing unit.

In addition, the image processing apparatus is a drive recorder (218).

With such a configuration, can implement the operations of the present embodiment on the drive recorder 218.

The invention is not limited to the foregoing embodiments, and various variations/changes are possible within the spirit of the invention.

What is claimed is:
1. An image processing apparatus comprising:
an image capturing unit configured to capture an image including a region corresponding to an inside of a vehicle and a region corresponding to an outside of the vehicle;
an acquisition unit configured to acquire a plurality of images captured by the image capturing unit at predetermined time intervals;
a generation unit configured to generate a mask filter for masking the region corresponding to the inside of the vehicle in the image captured by the image capturing unit based on an amount of change in the plurality of images acquired by the acquisition unit;
a storage unit configured to store the mask filter generated by the generation unit;
a processing unit configured to perform masking processing on the image captured by the image capturing unit by applying the mask filter stored in the storage unit on the region corresponding to the inside of the vehicle; and a detecting unit configured to detect a moving object on the outside of the vehicle, based on a region corresponding to the outside of the vehicle included in an image on which the masking processing is performed by the processing unit, wherein the region corresponding to the outside of the vehicle is a region on which the mask filter is not applied in the masking processing.

2. The image processing apparatus according to claim 1, wherein the generation unit generates the mask filter based on an averaged image obtained from the plurality of images acquired by the acquisition unit.

3. The image processing apparatus according to claim 2, wherein the generation unit acquires the averaged image by performing moving average along time series on a pixel value of each pixel of each of the plurality of images acquired by the acquisition unit.

4. The image processing apparatus according to claim 2, wherein the generation unit generates the mask filter by performing binarization processing on the averaged image.

5. The image processing apparatus according to claim 1, wherein image processing is performed on the image on which the masking processing is performed by the processing unit.

6. The image processing apparatus according to claim 5, wherein the image processing includes brightness adjustment.

7. The image processing apparatus according to claim 1, further comprising a display control unit configured to control a display unit based on a detection result by the detection unit.

8. The image processing apparatus according to claim 7, wherein the display control unit controls the display unit to display information related to a position of the moving object detected by the detection unit with respect to the vehicle.

9. The image processing apparatus according to claim 7, wherein the display unit is configured to be provided outside the image processing apparatus.

10. The image processing apparatus according to claim 9, wherein the display unit is an indicator.

11. The image processing apparatus according to claim 7, further comprising the display unit.

12. The image processing apparatus according to claim 1, wherein the acquisition unit acquires the plurality of images captured by the image capturing unit at the predetermined time intervals while the vehicle is traveling.

13. The image processing apparatus according to claim 1, wherein the image processing apparatus is a drive recorder.

14. An image processing method, comprising:
acquiring a plurality of images captured by an image capturing unit configured to capture an image including a region corresponding to an inside of a vehicle and a region corresponding to an outside of the vehicle at predetermined time intervals;
generating a mask filter for masking the region corresponding to the inside of the vehicle in the image captured by the image capturing unit based on an amount of change in the plurality of images acquired;
storing, in a storage unit, the mask filter generated;
performing masking processing on the image captured by the image capturing unit by applying the mask filter stored in the storage unit on the region corresponding to the inside of the vehicle; and
detecting a moving object on the outside of the vehicle, based on a region corresponding to the outside of the vehicle included in an image on which the masking processing is performed by the processing unit, wherein the region corresponding to the outside of the vehicle is a region on which the mask filter is not applied in the masking processing.

15. A non-transitory computer-readable storage medium storing a program for causing a computer to function to:
acquire a plurality of images captured by an image capturing unit configured to capture an image including a region corresponding to an inside of a vehicle and a region corresponding to an outside of the vehicle at predetermined time intervals;
generate a mask filter for masking the region corresponding to the inside of the vehicle in the image captured by the image capturing unit based on an amount of change in the plurality of images acquired;
store, in a storage unit, the mask filter generated;
perform masking processing on the image captured by the image capturing unit by applying the mask filter stored in the storage unit on the region corresponding to the inside of the vehicle; and
detect a moving object on the outside of the vehicle, based on a region corresponding to the outside of the vehicle included in an image on which the masking processing is performed by the processing unit, wherein the region corresponding to the outside of the vehicle is a region on which the mask filter is not applied in the masking processing.

* * * * *